Feb. 23, 1932.  H. B. HASKINS  1,846,552
VENTILATION SYSTEM FOR A CLOSED VEHICLE BODY
Filed June 13, 1929   3 Sheets-Sheet 1
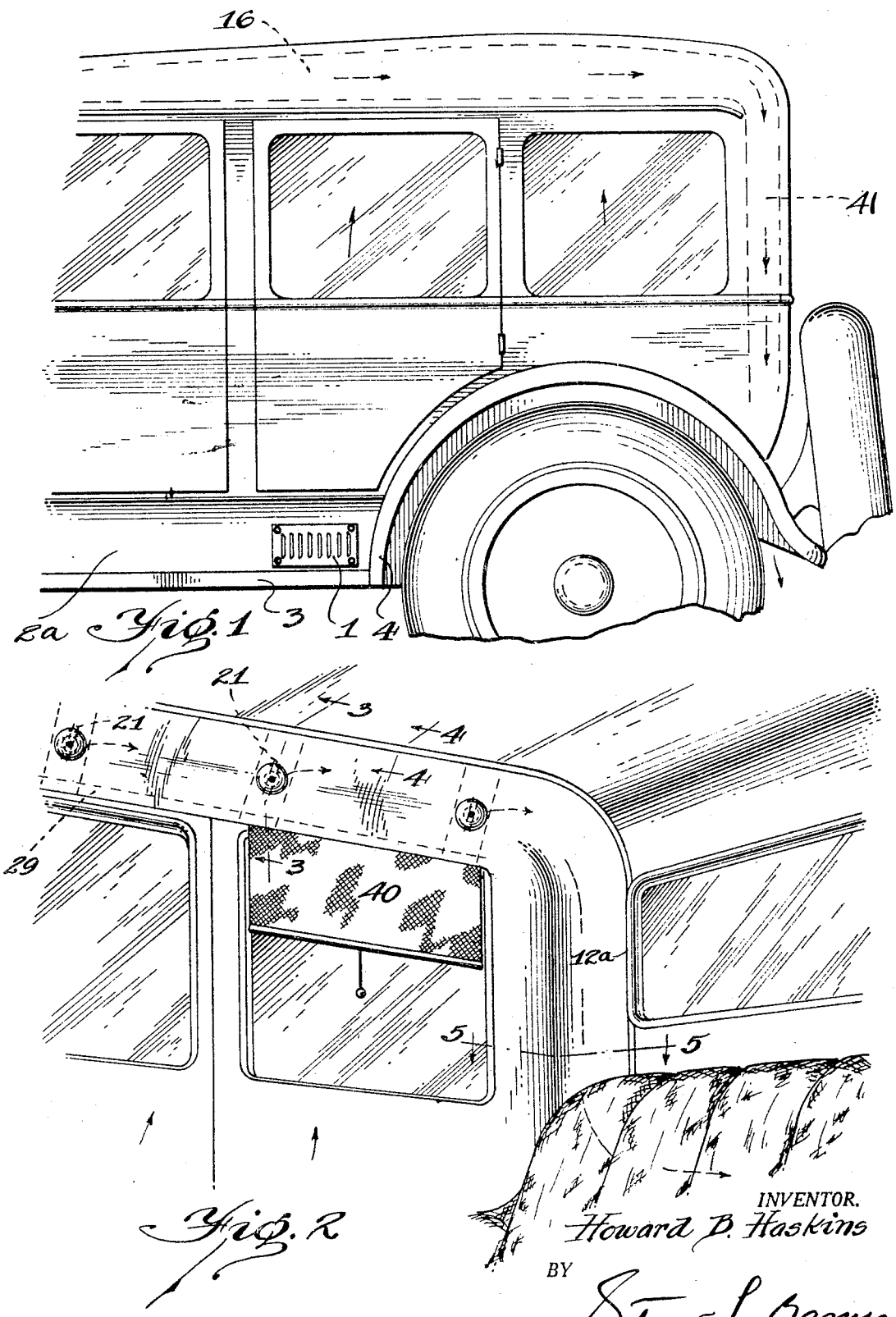
INVENTOR.
Howard B. Haskins
BY
Stuart C. Barnes
ATTORNEY.

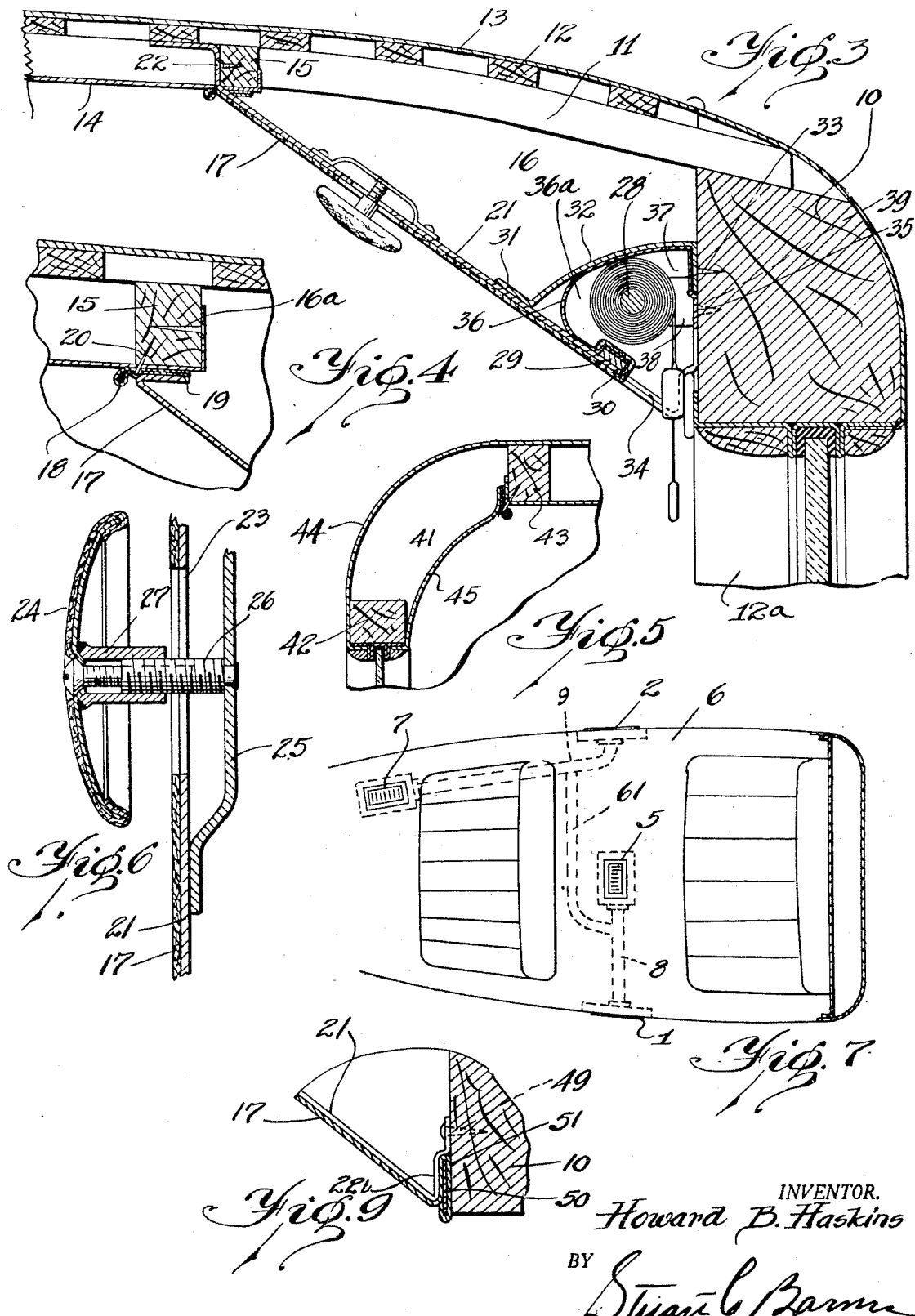

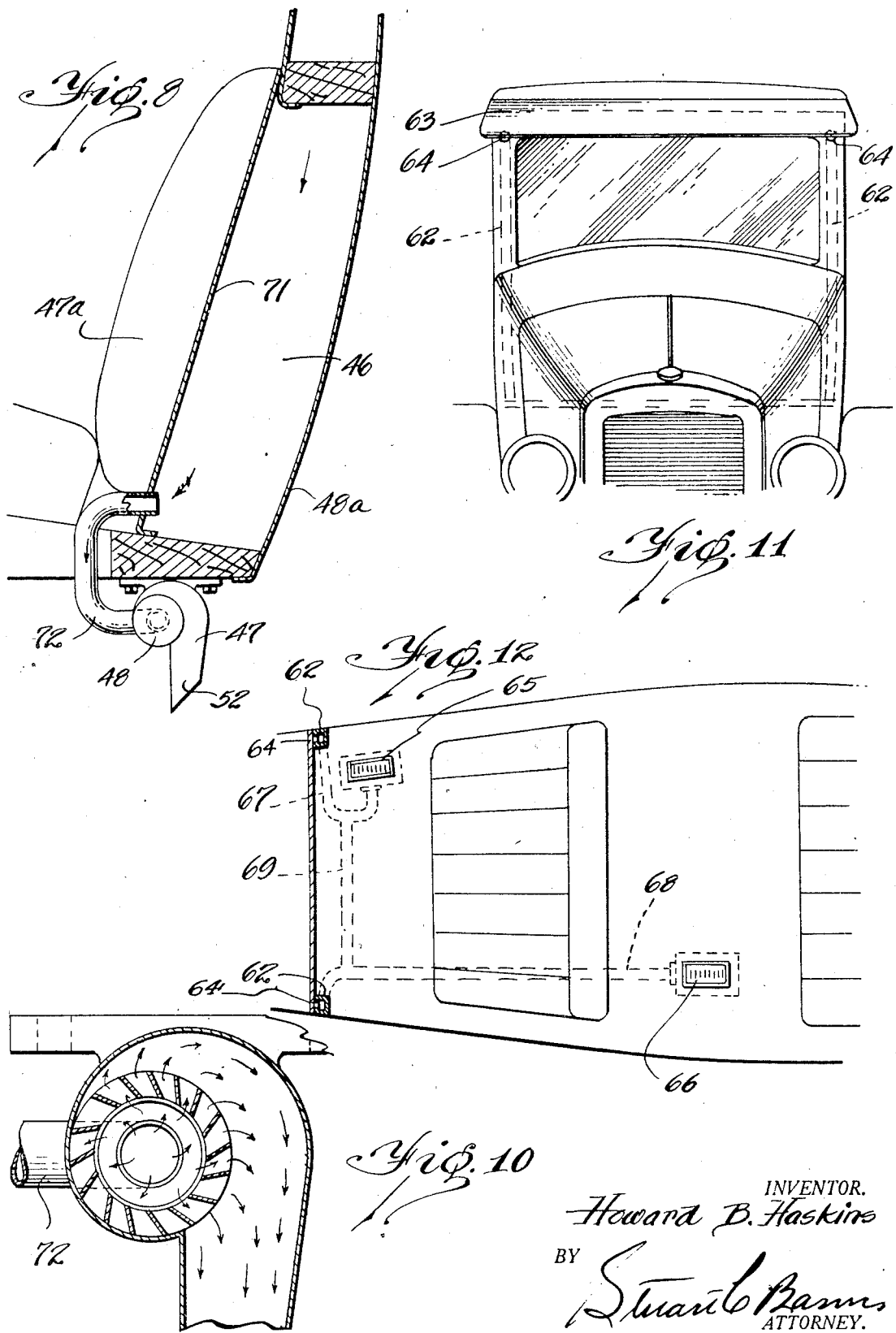

Patented Feb. 23, 1932

1,846,552

UNITED STATES PATENT OFFICE

HOWARD B. HASKINS, OF HIGHLAND PARK, MICHIGAN, ASSIGNOR TO TERNSTEDT MANUFACTURING COMPANY, OF DETROIT, MICHIGAN, A CORPORATION OF MICHIGAN

VENTILATION SYSTEM FOR A CLOSED VEHICLE BODY

Application filed June 13, 1929. Serial No. 370,475.

This invention relates to a vehicle body and more particularly to a ventilation system for a closed vehicle body.

In closed body ventilation a very important desideratum is the absence of drafts. It is one of the objects of this invention to efficiently ventilate the body without creating any drafts to the discomfort of the occupants. This has been achieved by withdrawing the air from the body uniformly along its length.

Since it is well known that the exhaust gases of automotive vehicles have their greatest concentration immediately adjacent the road surface, it is desirable to have the air intake ports situated as high above the ground as possible. This object is also achieved in this invention by taking in the air adjacent the roof and conveying it by suitable means to the floor of the vehicle.

Another object of this invention is to utilize a portion of the heading trimming to form the conduit, and a further object of the invention resides in the utilization of the trimming as a concealing means for the curtain roller.

In the drawings:

Fig. 1 is a fragmentary, elevation of a closed vehicle body.

Fig. 2 is a fragmentary perspective of the interior of a vehicle body.

Fig. 3 is a section along the line 3—3 of Fig. 2.

Fig. 4 is a section along the line 4—4 of Fig. 2.

Fig. 5 is a section along the line 5—5 of Fig. 2.

Fig. 6 is a section through one of the valves.

Fig. 7 is a horizontal section showing the location of one form of inlet conduits and registers.

Fig. 8 is a fragmentary vertical section showing the location of the motor and blower.

Fig. 9 is a fragmentary detailed section showing how the heading trimming is secured to the side roof rail along those portions where no curtain rollers are mounted.

Fig. 10 is a detailed view of the blower.

Fig. 11 is an elevation of an automobile showing a pair of hollow windshield pillars which serve as air conduits.

Fig. 12 is a view of the floor of the vehicle body with the windshield pillars in section showing the conduits connecting the intake registers with the hollow windshield pillar conduits.

Referring more particularly to the drawings it will be seen that fresh air may be supplied by two intake ports 1 and 2 located one on each side of the body in the splashboards 2a immediately above the running board 3 and adjacent the rear fender 4. The intake ports 1 and 2 are connected respectively to the rear register 5 in the floor 6 between the front and rear seats and to the register 7 in the floor 6 in front of the front seat by the conduits 8 and 9. The registers 5 and 7 are provided with suitable shutters. It is understood that the conduits 8 and 9 may be suitably connected with an exhaust heater or any other type of heater to heat the air prior to its entrance into the closed body. It is also understood that suitable air-cleaners may be placed in any suitable position to purify the air prior to its passage through the intake registers 5 and 7.

It often happens that the wind blows transversely of the vehicle body and in such a case the air pressure at intake 2 would be either greater or less than that at intake 1 and consequently register 5 would supply either more or less air to the inside of the body than register 7. In order to equalize the air pressure at intake 1 and intake 2 there is provided a conduit 61 which connects the air conduits 8 and 9 and thereby equalizes the air pressure in conduits 8 and 9.

Although there is above outlined an arrangement of ports and conduits for conveying air into the body the air is preferably taken in at a point adjacent the roof owing to the fact that the air near the top of the vehicle body is much purer than that immediately adjacent the road surface where the exhaust gases are most concentrated. To this end, as shown in Figs. 11 and 12, there is provided a pair of hollow windshield pillars 62 which communicate with the atmosphere beneath the visor 63 through the intake ports 64. The hollow windshield pillars are connected at their lower ends to suitable registers 65 and 66 by the conduits 67 and 68. For the purpose of equalizing the air pressure in the conduits 67 and 68, the said conduits are connected by a suitable conduit 69. Although the air is here taken in through the hollow windshield pillars it is understood that any other of the body pillars might be made hollow and equally as well utilized for air conduits.

For the purpose of exhausting the air from within the body, there is provided two conduits, each running lengthwise of the body in the upper corner formed by the roof 13 and side 12a of the body. This arrangement of conduits has required a slight modification of the usual interior construction of the body adjacent the upper corners. The body has the usual side roof rail 10 which carries the cross bow 11. Running lengthwise of the cross bow 11 in spaced relation are the roof slats 12 which are covered over by the usual canopy 13. The interior of the roof is trimmed with the usual heading material 14, but instead of securing the heading material across the entire top directly from side roof rail to side roof rail, the material is tacked or otherwise suitably secured to the roof strainer bars 15 by the tacks 16a. The roof strainer bars 15 extend lengthwise of the top between the adjacent roof bows on each side of the roof parallel to the side roof rails 10 and spaced therefrom any suitable distance. The trimming material is then extended diagonally as at 17 to the base of the side roof rail 10 to form the conduits 16. The portion of trimming material 17 cooperates with the side roof rail and the portion of the roof between the strainer bars 15 and the roof rail 10 to form the lengthwise conduit 16. The portion 17 of the trimming material is here shown as a separate strip, but it is understood that the portions 14 and 17 of the heading trimming may be integral.

In Fig. 4 there is shown one of the many suitable ways of securing the strip 17 to the strainer bar 15. As here shown, the end of the strip 17 is suitably secured to a welt 18 as at 19. The edge of the strip 17 to which the welt 18 is sewed is turned inward and the welt is then secured to the strainer bar 15 by any suitable means such as the tacks 20.

Suitable intake ports are provided for the conduits 16 in order that the air may be withdrawn simultaneously from several parts of the car which tends to obviate any noticeable drafts. To this end there is mounted in spaced relation between the strainer bars 15 and the side roof rail 10, the exhaust port valve support strips 21. These support strips 21 are suitably secured to the strainer bars 15 by the screws 22 and at their lower ends to the side roof rail 10 in a manner herein described below.

The strip 17 is drawn tightly against the support strips 21. The support strips 21 are provided with the openings 23 and the strip material 17 is cut away at the opening 23 to provide intake ports for the conduit 16. A dish-shaped valve 24 is provided for the port 23. The support strip 21 has spot-welded thereto the strip 25 which extends across the opening 23. The strip 25 has riveted therein the threaded stud 26 which passes centrally through the opening 23. The valve 24 has projecting therefrom, the interiorly threaded stud 27 which threadedly engages the stud 26 to adjust the valve 24 relative to the opening 23.

As shown in Fig. 3, the curtain roller 28 is concealed from view. To provide for the concealment of the curtain roller 28, a strip of metal 29 is spot-welded to the ends 30 of the support bars 21 parallel to the roof rail and in spaced relation thereto. Spaced from the ends 30 of the support bars 21, and spot-welded thereto, as at 31, is the bar 32 which extends diagonally from the bar 21 to the roof rail 10 to which it is secured by the screws 33.

In order to prevent ingress of air from the interior of the body through the opening 34 between the end of the strip material 17 and the side roof rail, there is suitably secured to the side roof rail 10 as at 35, to the bar 32, and to the bar 29, the strip of cloth 36 extending lengthwise of the conduit 16. This arrangement provides a suitable opening 37 in which to mount the curtain roller 28 which is supported by the brackets 38 which in turn are secured to the side roof rail 10 by any suitable means such as the screws 39. By referring to Fig. 2, it will be noted that when the curtain 40 is raised, it is completely concealed from view. The ends of the opening 37 are closed by the turned in ends 36a of the strip 36.

The conduit 16 communicates with the conduit 41 (Fig. 5) which extends downward from the side roof rail between the rear corner pillars 42 and 43, the rear quarter panel 44, and the trimming material 45. The conduits 41 communicate with the chamber 46 formed by the cardboard sealing sheet 71 adjacent the rear seat back 47a and by the rear panel 48a. The blower 47 communicates with the chamber 46 by means of conduit 72 and has the discharge nozzle 52 and is operated by a suitable electric motor 48.

Inasmuch as it is customary not to have shades for the front door windows, it will be unnecessary to provide an opening 37 above the front door windows, hence, the support bars 21 are there connected directly to the side roof rail 10 by any suitable means such as the screw 49. By referring to Fig. 9, it will be noted that the support bar 21 has a bent portion 22b which is spaced from the side roof rail 10. Hence, where there are no curtain rollers, the trimming strip 17 is suitably wrapped about, and secured to, a strip of cardboard 50 which is wedged into the opening 51 between the bent end 22b of the bar 21 and the side roof rail 10.

In operation, when the valves 24 are open, the air is taken in through the intake ports 64 of the hollow pillar conduits 62 which communicate with the registers 65 and 66, and is then disseminated throughout the interior of the closed body; from thence it is uniformly exhausted throughout the length of the body through the ports 23, through the conduits 16, and out to the atmosphere through the vertical conduits 41, chamber 46 and the blower 47.

What I claim is:

1. In a vehicle body having a roof and a side forming a corner and heading trimming for covering the interior of the body, a ventilation system including an exhaust conduit extending lengthwise of the said corner, the said trimming extending diagonally from the roof to the side to form the said conduit, a plurality of apertured strips extending diagonally from the roof to the side, the said trimming being cut away adjacent said apertures whereby the air is exhausted from the inside of said body at a plurality of points, closure members for said apertures, and means for exhausting the air through said conduit.

2. A ventilation system for a closed vehicle body comprising in combination, a hollow body pillar having one end communicating with the atmosphere adjacent the top of the body and the other end communicating with the inside of the body adjacent the floor of said body to form an intake conduit, one or more exhaust conduits extending lengthwise of said body, one or more exhaust conduits extending vertically of the rear quarter and communicating with the said conduits, and blower means associated with said conduits for taking air into the body through the intake conduits and exhausting the air through the lengthwise and vertical exhaust conduits.

3. A ventilation system for a closed vehicle comprising in combination, a hollow body pillar having one end communicating with the atmosphere adjacent the roof of the body and the other end communicating with an aperture in the floor to form an intake conduit, one or more exhaust conduits extending lengthwise of the said body and having a plurality of openings therein, valves for the said openings, one or more exhaust conduits extending vertically of the said body and communicating with the said lengthwise conduits, and means associated with the said conduits for taking air into the body through the intake conduits and exhausting the air through the lengthwise and vertical exhaust conduits.

In testimony whereof I affix my signature.

HOWARD B. HASKINS.